United States Patent
Gutacker et al.

(10) Patent No.: US 12,441,847 B2
(45) Date of Patent: Oct. 14, 2025

(54) BI-FUNCTIONALIZED POLYSILOXANE BRUSH COPOLYMERS

(71) Applicant: Henkel AG & Co. KGaA, Duesseldorf (DE)

(72) Inventors: Andrea Gutacker, Langenfeld (DE); Ligang Zhao, Duesseldorf (DE); Johann Klein, Duesseldorf (DE); Esteban Mejia, Rostock (DE); Annika Dietrich, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 410 days.

(21) Appl. No.: 18/069,499

(22) Filed: Dec. 21, 2022

(65) Prior Publication Data

US 2023/0117393 A1  Apr. 20, 2023

Related U.S. Application Data

(63) Continuation of application No. PCT/EP2021/066358, filed on Jun. 17, 2021.

(30) Foreign Application Priority Data

Jul. 1, 2020  (EP) .................... 20183386

(51) Int. Cl.
| | | |
|---|---|---|
| C08G 77/46 | (2006.01) | |
| A01N 55/00 | (2006.01) | |
| A01P 1/00 | (2006.01) | |
| C09D 5/14 | (2006.01) | |
| C09D 183/12 | (2006.01) | |
| C09J 183/12 | (2006.01) | |
| C09K 3/10 | (2006.01) | |

(52) U.S. Cl.
CPC .............. *C08G 77/46* (2013.01); *A01N 55/00* (2013.01); *A01P 1/00* (2021.08); *C09D 5/14* (2013.01); *C09D 183/12* (2013.01); *C09J 183/12* (2013.01); *C09K 3/1018* (2013.01); *C09K 2200/0685* (2013.01)

(58) Field of Classification Search
None
See application file for complete search history.

(56) References Cited

U.S. PATENT DOCUMENTS

| | | | |
|---|---|---|---|
| 2,823,218 A | 2/1958 | Speier et al. | |
| 3,715,334 A | 2/1973 | Karstedt | |
| 3,723,491 A | 3/1973 | Rossmy et al. | |
| 3,814,730 A | 6/1974 | Karstedt | |
| 3,923,705 A | 12/1975 | Smith | |
| 4,654,161 A | 3/1987 | Kollmeier et al. | |
| 4,895,964 A * | 1/1990 | Margida ............... | C08G 77/388 556/425 |
| 5,536,883 A | 7/1996 | Le-Khac | |
| 5,767,323 A | 6/1998 | Televantos et al. | |
| 7,875,692 B2 | 1/2011 | Miyazawa et al. | |
| 9,458,286 B2 | 10/2016 | Zander et al. | |
| 2003/0069389 A1 | 4/2003 | Eleveld et al. | |
| 2003/0158449 A1 | 8/2003 | Hofmann et al. | |
| 2004/0220430 A1 | 11/2004 | Eleveld et al. | |
| 2005/0065383 A1 | 3/2005 | Wehmeyer | |
| 2006/0020098 A1 | 1/2006 | Miyazawa et al. | |
| 2008/0167502 A1 | 7/2008 | Bohres et al. | |

FOREIGN PATENT DOCUMENTS

| | | | |
|---|---|---|---|
| EP | 0894108 B1 | 7/2001 | |
| EP | 3663371 | 6/2020 | |
| EP | 3663372 A1 | 6/2020 | |
| GB | 2201433 A * | 9/1988 | ........ D06M 15/6436 |
| WO | 2012136657 A1 | 10/2012 | |

OTHER PUBLICATIONS

International Search Report for International PCT Patent Application No. PCT/EP2021/066358 dated Sep. 9, 2021.

* cited by examiner

*Primary Examiner* — Robert S Loewe
(74) *Attorney, Agent, or Firm* — Mary K. Cameron

(57) ABSTRACT

The invention relates to a bi-functionalized polysiloxane brush copolymer comprising at least one hydroxyl-terminated polyalkyleneglycol side chain and at least one onium-functionalized side chain as defined herein, and a method for preparing the bi-functionalized polysiloxane brush copolymer, a curable composition comprising the bi-functionalized polysiloxane brush copolymer and its use.

15 Claims, No Drawings

BI-FUNCTIONALIZED POLYSILOXANE BRUSH COPOLYMERS

The invention relates to a bi-functionalized polysiloxane brush copolymer comprising at least two types of functional side-chains comprising at least one hydroxyl-terminated polyalkyleneglycol side-chain and at least one onium-functionalized side-chain, a method for preparing the bi-functionalized polysiloxane brush copolymer, a curable composition comprising the bi-functionalized polysiloxane brush copolymer and its use.

Siloxanes, more precisely silicones, with functionalized groups are already known in literature. Most papers or patents deal with branched silicones which contain only siloxane groups or functional groups connected via silyl-carbon bonds, or silicones having alkyl or acyl groups, which have no special functionality or are very unreactive.

A number of classes of polysiloxane polyalkyleneglycol copolymers are known in literature. The combination of both polymers, polyalkenylglycol and polysiloxane, in one copolymer can be used in formulations for surfactants, adhesives or sealants. Depending on their relative proportions, the properties of the copolymers can be tailored.

The preparation of polysiloxane polyalkyleneglycol copolymers can be done by various methods. Block copolymers can be formed by reaction of difunctionally-terminated siloxane oligomers with mono- or difunctionally-terminated alkyleneglycol monomers or oligomers. Such techniques are reported in U.S. Pat. No. 3,723,491. Most often hydrolysis, hydrosilylation or alkylation reactions are used. The formed copolymers are $AB_y$ or ABA linear block copolymers.

By derivatization along the polymer main backbone instead of at its end-positions, polysiloxane polyalkyleneglycol brush copolymers, instead of linear, can be obtained. However, the copolymerization of side-groups has much more difficulties than that of end-groups. For example, conversion, reaction speed, polydispersity or viscosity depend on the steric hindrance that arises from nearby located side-groups. Therefore, to move from end-group copolymerization to a side-group polymerization is not a trivial task.

Although hydrosilylation is a well-known reaction pathway, it brings some disadvantages when applied to the synthesis of brush copolymers. In terms of size, it is less likely that a comparatively small reactive side group in a polymeric starting material gets in contact with another functional group to form a polymeric network. The result is a mixture of the desired product, half reacted products, unreacted C═C double bonds and SiH groups, as well as side reactions of the OH-functional end groups. Therefore, the molecular mass cannot be controlled well. Furthermore, there is no option to change the chain length of the side-chains.

The synthetic pathway to provide hydroxyl-functionalized unimodal polysiloxane polyalkyleneglycol brush copolymers with a controllable degree of polymerization of side chains and a polydispersity of from 1.3 to 5.0 is described in EP patent application no. 18210646.8.

However, a need still exists to provide polysiloxane polyalkyleneglycol brush copolymers which can additionally provide an antimicrobial activity.

Therefore, it is an object of the present invention to provide a polysiloxane polyalkyleneglycol brush copolymer having an antimicrobial activity.

The polysiloxane brush copolymer according to the invention contains at least one hydroxyl-terminated polyalkyleneglycol side-chain and additionally at least one onium-functionalized side-chain from the $15^{th}$ or $16^{th}$ group of the periodic table which display an antimicrobial activity, thereby providing the combined advantages of both functionalities.

The first functionality, i.e., hydroxyl-terminated polyalkyleneglycol-functionality, is able to affect the surface energy in its solid state to avoid residual water and bacterial fouling. The second functionality, i.e., onium-functionality, shows an antimicrobial activity, for instance against fungi, yeasts and gram-positive and gram-negative bacteria. The onium functionalities in the polysiloxane brush copolymer according to the invention are attached to the siloxane backbone through a hydrolysable silyl-heteroatomic (Si-Het) bond, preferably a silyl-oxo (Si—O) bond, which allows the active functionalities to be released or leached out of the material in a controlled manner, enhancing their antimicrobial activity, for instance against fungi, yeasts and gram-positive and gram-negative bacteria. Therefore, the polysiloxane brush copolymer according to the invention possesses both of surface properties that can inhibit microbial fouling and antimicrobial properties.

In accordance with the first aspect of the invention there is provided a bi-functionalized polysiloxane brush copolymer comprising
 at least one hydroxyl-terminated polyalkyleneglycol side chain —[—S—B]; and
 at least one onium-functionalized side chain -[-T-C],
 wherein:
  B represents hydroxyl-terminated polyalkyleneglycol side chain;
  S is a linker group characterized by including the moiety Si—C—C— of which said Si is a part of the polysiloxane backbone;
  C represents an onium-functionalized side chain;
  T is a linker group characterized by including the moiety of Si-heteroatom-C— of which said Si is a part of the polysiloxane backbone.

In preferred embodiments, the polysiloxane backbone contains less than 500 ppm mol %, preferably less than 10 ppm mol %, more preferably less than 2 ppm mol %, of SiH moiety based on the total moles of the silicon atom which constitutes the polysiloxane backbone.

The invention also provides a method for preparing said bi-functionalized polysiloxane brush copolymer.

In a further aspect, the invention relates to a curable composition comprising the bi-functionalized polysiloxane brush copolymer according to the invention.

Yet another aspect, the invention provides use of the bi-functionalized polysiloxane brush copolymer according to the invention or obtained by the method according to the invention as an antimicrobial agent, preferably against mols, yeasts, fungi, gram-positive bacteria, or gram-negative bacteria.

As used herein, the singular forms "a", "an" and "the" include plural referents unless the context clearly dictates otherwise.

The terms "comprising" and "comprises" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

As used herein, room temperature is 23° C. plus or minus 2° C.

The molecular weights given in the present text refer to number average molecular weights (Mn), unless otherwise stipulated. All molecular weight data refer to values obtained by gel permeation chromatography (GPC) carried out using HP1090 II Chromatography with DAD detector (HEWLETT PACKARD) at 40° C. Tetrahydrofuran (THF) was used as an eluent. THF was passed through three PSS SDV gel columns with molecular weight ranges of 102, 103 and 104 g·mol$^{-1}$ with a flow rate of 0.9 ml·min$^{-1}$. The calibration of the device was carried out using polystyrene standards.

As used herein, "polydispersity" refers to a measure of the distribution of molecular mass in a given polymer sample. The polydispersity is calculated by dividing the weight average molecular weight (Mw) by the number average molecular weight (Mn).

For convenience in the description of the process of this invention, unsaturation provided by CH$_2$=CH—CH$_2$— terminal group is referred to as "allyl" unsaturation.

As used herein, "C$_1$-C$_8$ alkyl" group refers to a monovalent group that contains 1 to 8 carbons atoms, that is a radical of an alkane and includes linear and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1 to 6 carbon atoms (C$_1$-C$_6$ alkyl)- for example unsubstituted alkyl groups containing from 1 to 4 carbon atoms (C$_1$-C$_4$ alkyl)- should be noted.

As used herein, the term "C$_2$-C$_8$ alkenyl" group refers to an aliphatic hydrocarbon group which contains 2 to 8 carbon atoms and at least one carbon-carbon double bond, e.g., ethenyl, propenyl, butenyl, or pentenyl and structural isomers thereof such as 1- or 2-propenyl, 1-, 2-, or 3-butenyl, etc. Alkenyl groups can be linear or branched and substituted or unsubstituted. If they are substituted, the substituents are as defined above for alkyl.

As used herein, the term "C$_2$-C$_8$ alkynyl" group refers to an aliphatic hydrocarbon group which contains 2 to 8 carbon atoms and at least one carbon-carbon triple bond, e.g., ethynyl (acetylene), propynyl, butynyl, or pentynyl and structural isomers thereof as described above. Alkynyl groups can be linear or branched and substituted or unsubstituted.

The term "C$_3$-C$_{10}$ cycloalkyl" is understood to mean a saturated, mono-, bi- or tricyclic hydrocarbon group having from 3 to 10 carbon atoms. Examples of cycloalkyl groups include: cyclopropyl; cyclobutyl; cyclopentyl; cyclohexyl; cycloheptyl; cyclooctyl; adamantane; and, norbornane.

As used herein, an "C$_6$-C$_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl, tetrahydronaphthyl, tetrahydroindenyl; tetrahydroanthracenyl; and, anthracenyl. And a preference for phenyl groups may be noted.

As used herein, an "aralkyl" group refers to an alkyl group that is substituted with an aryl group. An example of an aralkyl group is benzyl.

The terms "C$_1$-C$_{60}$ alkylene" group and "C$_1$-C$_{20}$ alkylene" group refer respectively to divalent groups that contain from 1 to 60 or from 1 to 20 carbon atoms, that are radicals of an alkane and include linear, branched or cyclic groups, which groups may be substituted or substituted and may optionally be interrupted by at least one heteroatom.

As used herein, the term "alkenylene" group refers to a divalent aliphatic hydrocarbon group having at least one carbon-carbon double bond that is a radical of an alkene. An alkenylene group can be linear or branched and substituted or unsubstituted.

As used herein, the term "alkynylene" group refers to a divalent aliphatic hydrocarbon group having at least one carbon-carbon triple bond, that is a radical of an alkyne. An alkynylene group can also have one or more carbon-carbon double bonds. An alkynylene group can be linear or branched and substituted or unsubstituted.

As used herein, the term "arylene" group refers to a divalent group that is a radical of an aryl group. Suitable arylene group includes phenylene, furanylene, piperidylene, and naphthylene.

As used herein, the term "aralkylene" group refers to a divalent group that is a radical of an aralkyl group. An aralkylene can be represented by the formula —R—Ar— where R is an alkylene and Ar is an arylene, i.e., an alkylene is bonded to an arylene. Suitable aralkylene groups includes xylylene and toluenylene.

Where mentioned, the expression "contain at least one heteroatom" means that the main chain or side chain of a residue comprises at least one atom that differs from carbon atom and hydrogen. Preferably the term "heteroatom" refers to nitrogen, oxygen, silicon, sulfur, phosphorus, halogens such as Cl, Br, F. Oxygen (O) and nitrogen (N) may be mentioned as typical heteroatoms in the context of the present invention.

As used herein, the term "hydrocarbon residue" includes saturated or unsaturated hydrocarbon residues.

As used herein, the "heterocyclic compound" refers to a saturated or unsaturated, monocyclic, bicyclic, polycyclic or fused compound containing at least one heteroatom, preferably O, S, N, and/or P, in the ring structure.

As used herein, the term "halogen" refers to fluorine, chlorine, bromine or iodine and correspondingly the term "halide" denotes fluoride, chloride, bromide or iodide anions.

The term "pseudohalogen" refers to inorganic or organic groups which, when in the form of anions exhibit chemical properties similar to those of the halide ions. Pseudohalogen groups include, although are not exclusive to, CN, N$_3$, OCN, NCO, SCN, NCS.

As used herein, the term "onium cation" refers to a cation formally obtainable by protonation of the hydride of a heteroatom from the groups 15 or 16 of the periodic table, including, but not limited to ammonium, phosphonium, arsonium, oxonium and sulfonium. The name onium is also used for cations that might result from the replacement of hydrogen atoms in said ions by other groups, including organic radicals, or halogens.

In preferred embodiments, the bi-functionalized polysiloxane brush copolymer according to the invention has the number average molecular weight (Mn) of from 1000 to 200,000 g/mol, more preferably from 2000 to 100,000 g/mol.

In preferred embodiments, the bi-functionalized polysiloxane brush copolymer according to the invention is represented by Formula (I)

Y is an onium cation;

X is an anion selected from halide anions, pseudohalide anions, oxoanions, anions from organic acids or inorganic anions;

n1 and n2 are an integer independently selected from 0 to 1000, preferably from 2 to 500, more preferably from 5 to 100, with the proviso that not both of n1 and n2 are 0;

n3 is an integer selected from 1 to 1000, preferably from 2 to 500, more preferably from 5 to 100;

n4 is an integer from 0 to 10, preferably from 0 to 5, more preferably from 0 to 2, most preferably from 0 to 1;

p is an integer from 0 to 1000, preferably from 1 to 500, more preferably from 5 to 100; and Formula (I)

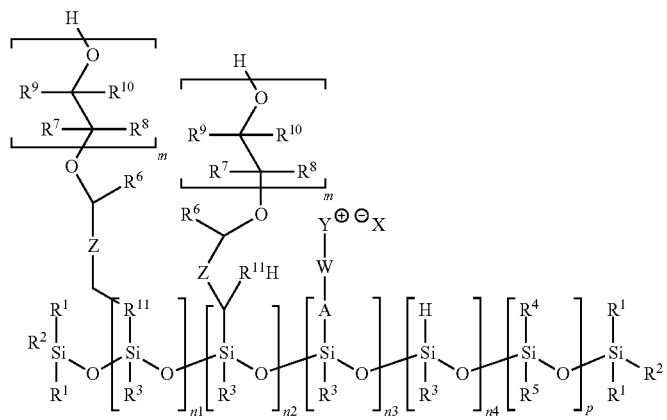

wherein:

Z is a covalent bond or selected from a polyoxyalkylene having a molecular weight of less than 10000 g/mol or a linear, branched or cyclic hydrocarbon residue having 1 to 20 carbon atoms which may contain at least one heteroatom;

each $R^1$, $R^2$, $R^3$, $R^4$ and $R^5$ may be the same or different and are independently selected from a linear, branched or cyclic hydrocarbon residue having 1 to 20 carbon atoms which may contain at least one heteroatom, wherein $R^3$, $R^4$ and $R^5$ may be independently selected in each unit n1, n2, n3, n4, and p;

$R^{11}$ is selected from a linear, branched or cyclic hydrocarbon residue having 1 to 20 carbon atoms which may contain at least one heteroatom;

$R^6$ is selected from hydrogen or a linear, branched or cyclic hydrocarbon residue having 1 to 20 carbon atoms which may contain at least one heteroatom;

$R^7$, $R^8$, $R^9$ and $R^{10}$ may be the same or different and in each unit m they are independently selected from hydrogen or a linear, branched or cyclic hydrocarbon residue having 1 to 20 carbon atoms which may contain at least one heteroatom;

A is a heteroatom, preferably O or S, or a heteroatom-containing group, preferably $NR^{12}$ or $PR^{12}$, where $R^{12}$ is selected from hydrogen, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom;

W is selected from a linear, branched or cyclic hydrocarbon residue having 2 to 60 carbon atoms which may contain at least one heteroatom;

m is an integer from 1 to 1500, preferably from 1 to 1000.

In Formula (I), the different siloxane subunits n1, n2, n3, n4 and p are not necessarily present in the order illustrated herein. The subunits n1, n2, n3, n4 and p can be randomly distributed in the siloxane backbone in every possible combination.

In Formula (I) Z is a covalent bond or selected from a polyoxyalkylene having a molecular weight of less than 10000 g/mol or a linear, branched or cyclic hydrocarbon residue having 1 to 20 carbon atoms which may contain at least one heteroatom, preferably selected from a $C_1$-$C_{20}$ alkylene group, more preferably a $C_1$-$C_8$ alkylene group, a $C_6$-$C_{18}$ arylene group or a $C_6$-$C_{18}$ aralkylene group, which may contain at least one heteroatom, preferably selected from O, N, S, P, Cl, Br or F.

In more preferred embodiments, Z is a covalent bond or selected from a $C_1$-$C_{20}$ alkylene group, in particular a $C_1$-$C_8$ alkylene group, a $C_6$-$C_{18}$ arylene group or a $C_6$-$C_{18}$ aralkylene group, which may contain at least one heteroatom, preferably selected from O, N, S, P, Cl, Br or F.

In particular, Z is a $C_1$-$C_{20}$ alkylene group, more preferably a $C_1$-$C_8$ alkylene group, which may contain at least one heteroatom, preferably selected from O, N, S, P, Cl, Br or F, in particular O. In particularly preferred embodiments, Z is a $C_1$-$C_8$ alkylene group which contains O.

In Formula (I) $R^6$ is selected from hydrogen or a linear, branched or cyclic hydrocarbon residue having 1 to 20 carbon atoms which may contain at least one heteroatom, preferably selected from a $C_1$-$C_{12}$ alkyl group, more preferably a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, P, Cl, Br or F. In more preferred embodiments, $R^6$ is selected from hydrogen or a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, P, Cl, Br or F. In most preferred embodiments, $R^6$ is selected from hydrogen or a $C_1$-$C_8$ alkyl group, in particular methyl group.

In Formula (I) $R^{11}$ is selected from a linear, branched or cyclic hydrocarbon residue having 1 to 20 carbon atoms which may contain at least one heteroatom, preferably $CR^a_2$ where each $R^a$ may be the same or different and is independently selected from hydrogen, a $C_1$-$C_{12}$ alkyl group, in particular a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, P, Cl, Br or F. Alternatively, both $R^a$ can form a cyclic structure which may contain at least one heteroatom. In preferred embodiments, both $R^a$ are hydrogen.

In Formula (I), $R^1$, $R^2$, $R^3$, $R^4$ and $R^5$ may be the same or different and are independently selected from a linear, branched or cyclic hydrocarbon residue having 1 to 20 carbon atoms which may contain at least one heteroatom, preferably selected from a $C_1$-$C_{12}$ alkyl group, more preferably a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, P, Cl, Br or F. In particular, $R^3$, $R^4$ and $R^5$ may be independently selected in each siloxane unit, i.e., units n1, n2, n3, n4, and p. In more preferred embodiments, $R^1$, $R^2$, $R^3$, $R^4$ and $R^5$ may be the same or different and are independently selected from a $C_1$-$C_8$ alkyl group, more preferably a $C_1$-$C_4$ alkyl group, which may contain at least one heteroatom, preferably selected from O, N, S, P, Cl, Br or F, in particular methyl, ethyl, n-propyl, fluoropropyl, n-butyl, sec-butyl, or tert-butyl, or a $C_6$-$C_{18}$ aryl group which may contain at least one heteroatom, preferably selected from O, N, S, P, Cl, Br or F, in particular phenyl, tolyl or benzoyl. In most preferred embodiments, $R^1$, $R^2$, $R^3$, $R^4$ and $R^5$ are the same or different and independently selected from methyl or phenyl.

In Formula (I), each $R^7$, $R^8$, $R^9$ and $R^{10}$ may be the same or different and in each unit m they are independently selected from hydrogen or a linear, branched or cyclic hydrocarbon residue having 1 to 20 carbon atoms which may contain at least one heteroatom, preferably selected from a $C_1$-$C_{12}$ alkyl group, more preferably a $C_1$-$C_8$ alkyl group, a $C_3$-$C_{10}$ cycloalkyl group, a $C_6$-$C_{18}$ aryl group or a $C_6$-$C_{18}$ aralkyl group, with the proviso that at least one of $R^9$ and $R^{10}$ is not hydrogen and may contain at least one heteroatom, preferably selected from O, N, S or Si. It is preferred that $R^7$, $R^8$ and $R^{10}$ are hydrogen and $R^9$ is either a phenyl group or a $C_1$-$C_8$ alkyl group and, more preferably, a $C_1$-$C_4$ alkyl group.

In Formula (I) A is a heteroatom, preferably selected from O or S, or a heteroatom-containing group, preferably $NR^{12}$ or $PR^{12}$, where $R^{12}$ is selected from hydrogen, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, P, Cl, Br or F. In more preferred embodiments, A is selected from O or S, in particular O, which provides a silyl-oxo bond between siloxane backbone and the onium-functionalized sidegroups.

In Formula (I) W is selected from a linear, branched or cyclic hydrocarbon residue having 2 to 60 carbon atoms, preferably 2 to 20 carbon atoms, which may contain at least one heteroatom, preferably selected from O, N, S, P, Si, Cl, Br or F. In preferred embodiments, W is selected from the group consisting of a $C_2$-$C_{20}$ alkylene group, a $C_2$-$C_{20}$ alkenylene group, $C_2$-$C_{20}$ alkynylene group, a $C_6$-$C_{18}$ arylene group and a $C_6$-$C_{18}$ aralkylene group, which may contain at least one heteroatom, preferably selected from O, N, S, P, Si, Cl, Br or F.

In Formula (I) Y is an onium cation, which can be represented as $ER^cR^d$ where E is a positively charged atom selected from the 16$^{th}$ group of the periodic table, preferably O, S or Se, or $ER^cR^dR^e$ where E is a positively charged atom selected from the 15$^{th}$ group of the periodic table, preferably N, P or As, wherein $R^c$, $R^d$ and $R^e$ may be the same or different and each is independently selected from hydrogen, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, Si, Cl, Br or F.

In Formula (I) X is an anion selected from halide anions, preferably selected from Br$^-$, I$^-$ or Cl$^-$; pseudohalide anions, preferably selected from cyanide (CN$^-$), azide (N$_3^-$), cyanate (OCN$^-$), isocyanate (NCO$^-$), thiocyanate (SCN$^-$), or isothiocyanate (NCS$^-$); oxoanions, preferably selected from nitrate, perchlorate, phosphate, sulfate, sulfite, or thiosulfate; anions from organic acids, preferably selected from acetate, formate, benzoate, or oxalate; or inorganic anions, preferably selected from Tf$_2$N$^-$, BF$_4^-$, SbF$_6^-$ or PF$_6^-$. In preferred embodiments, X is selected from halide anions or pseudohalide anions, more preferably selected from Br$^-$, I$^-$, Cl$^-$, cyanide (CN$^-$), azide (N$_3^-$), cyanate (OCN$^-$), isocyanate (NCO$^-$), thiocyanate (SCN$^-$), or isothiocyanate (NCS$^-$). In particularly preferred embodiments, X is selected from Br$^-$, I$^-$ or Cl$^-$, in particular Br$^-$ or I$^-$, most preferably Br$^-$.

In Formula (I) n1 and n2 are an integer independently selected from 0 to 1000, preferably from 2 to 500, more preferably from 5 to 100, with the proviso that not both of n1 and n2 are 0; n3 is an integer selected from 1 to 1000, preferably from 2 to 500, more preferably from 5 to 100; n4 is an integer from 0 to 10, preferably from 0 to 5, more preferably from 0 to 2, most preferably from 0 to 1; p is an integer from 0 to 1000, preferably from 1 to 500, more preferably from 5 to 100; and m is an integer from 1 to 1500, preferably from 1 to 1000.

In preferred embodiments, the ratio of n4 to the sum of n1+n2+n3+n4+p is selected from the ranges as defined above so that polysiloxane backbone contains less than 500 ppm mol %, preferably less than 10 ppm mol %, more preferably less than 2 ppm mol %, of SiH moiety based on the total moles of the silicon atom which constitutes the polysiloxane backbone.

The bi-functionalized polysiloxane brush copolymer according to the invention comprising a siloxane backbone and two functionalities as described above is obtainable by a multi-step process.

The hydroxyl-terminated polyalkyleneglycol side-chains can be obtained from a monomeric or polymeric, linear or cyclic siloxane having at least one SiH group in the main chain. In preferred embodiments, the method for preparing hydroxyl-terminated polyalkyleneglycol side-chains according to the invention comprises two steps: the step a) being a partial hydrosilylation reaction to form a hydroxyl-terminated polysiloxane prepolymer and the step b) being the ring-opening polymerization of at least one alkylene oxide in the presence of said hydroxyl-terminated polysiloxane prepolymer as a starter compound. The methods are described in the EP patent application nos. 18210646.8 and 18210647.6, the content of which is herein incorporated by reference in its entirety.

The onium-functionalized side-chains can be obtained from a monomeric, oligomeric or polymeric, linear or cyclic siloxane, in which at least one functionalized side-group, preferably halogen-functionalized or pseudohalogen-functionalized side-group, is bonded to the siloxane backbone through a silyl-heteroatom bond (Si-Het), preferably a silyl-oxo (Si—O) bond. In preferred embodiments, the method for producing onium-functionalized side-chains according to the invention comprises two steps: the step c) being a halosilation at the SiH functionalities left unreacted in the previous step, providing a functionalized siloxane prepolymer, preferably having halogen- or pseudohalogen functional groups which are bonded to the siloxane backbone through a silyl-heteroatomic (Si-Het) bond, preferably a silyl-oxo (Si—O) bond, and the step d) being a nucleophilic substitution by a nucleophile containing at least one atom selected from the $15^{th}$ or $16^{th}$ group of the periodic table, preferably N, P, As, O, S or Se, preferably in the absence of a catalyst to form onium-functionalized siloxanes.

The above-described multistep synthesis of the bi-functionalized polysiloxane brush copolymers can be carried out in different orders according to the invention. The reaction steps a), b), c) and d) can be carried in the order of a), b), c) and d); or in the order of c), d), a) and b); or in the order of a), c), d) and b); or in the order of a), c), b) and d). In any case, the step a) has to be done before the step b), and the step c) has to be done before the step d). The structure of the obtained bi-functionalized polysiloxane will be the same.

In case the step c) is done before the step a), the halosilation reaction in the step c) is done partially so that the SiH functionalities left unreacted in this step can be used for hydrosilylation reaction in the later step a).

In preferred embodiments, the method for preparing the bi-functionalized polysiloxane brush copolymer of Formula (I) according to the invention comprises the steps of:
a) reacting a hydroxyalkyl allyl ether having a primary or secondary alcohol group with a polyhydridosiloxane under catalysis of a transition metal catalyst of which the transition metal is selected from Groups 8 to 10 of the Periodic Table to provide a hydroxyl-functionalized polysiloxane prepolymer having Formula (II),

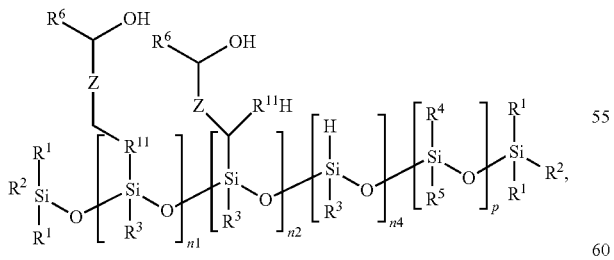

Formula (II)

wherein:
Z is a covalent bond or selected from a polyoxyalkylene having a molecular weight of less than 10000 g/mol or a linear, branched or cyclic hydrocarbon residue having 1 to 20 carbon atoms which may contain at least one heteroatom;

each $R^1$, $R^2$, $R^3$, $R^4$ and $R^5$ may be the same or different and are independently selected from a linear, branched or cyclic hydrocarbon residue having 1 to 20 carbon atoms which may contain at least one heteroatom, wherein $R^3$, $R^4$ and $R^5$ may be independently selected in each unit n1, n2, n4, and p;

$R^{11}$ is selected from a linear, branched or cyclic hydrocarbon residue having 1 to 20 carbon atoms which may contain at least one heteroatom;

$R^6$ is selected from hydrogen or a linear, branched or cyclic hydrocarbon residue having 1 to 20 carbon atoms which may contain at least one heteroatom;

n1 and n2 are an integer independently selected from 0 to 1000, preferably from 2 to 500, more preferably from 5 to 100, with the proviso that not both of n1 and n2 are 0;

n4 is an integer from 1 to 1000, preferably from 2 to 500, more preferably from 2 to 100; and p is an integer from 0 to 1000, preferably from 1 to 500, more preferably from 5 to 100, said hydroxyalkyl allyl ether conforming to Formula (III), and

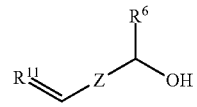

Formula (III)

wherein:
Z, $R^{11}$ and $R^6$ are the same as defined for Formula (II), said polyhydridosiloxane conforming to Formula (IV)

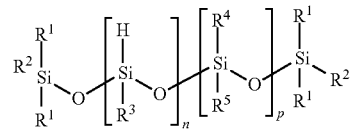

Formula (IV)

wherein:
$R^1$, $R^2$, $R^3$, $R^4$, $R^5$ and p are the same as defined for Formula (II); and
n is n1+n2+n4, wherein n1, n2 and n4 are the same as defined for Formula (II), b) in the presence of the obtained hydroxyl-functionalized polysiloxane prepolymer of Formula (II) and a catalyst, performing a ring-opening polymerization of at least one alkylene oxide monomer having Formula (V) to obtain a SiH-containing polysiloxane-g-polyalkenylglycol polymer of Formula (VI)

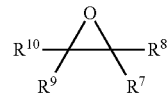

Formula (V)

wherein:
each $R^7$, $R^8$, $R^9$ and $R^{10}$ may be the same or different and are independently selected from hydrogen or a linear, branched or cyclic hydrocarbon residue having 1 to 20 carbon atoms which may contain at least one heteroatom, Formula (VI)

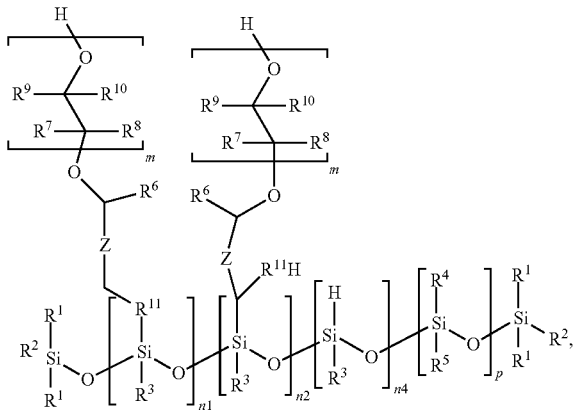

wherein:
$R^1$ to $R^{11}$, Z, n1, n2, n4, p and m are the same as defined for Formulas (II) to (V),
c) reacting the obtained SiH-containing polysiloxane-g-polyalkenylglycol polymer of Formula (VI), at least one heterocyclic compound, and at least one compound of Formula (VIII) in the presence of at least one metal catalyst to obtain a polymer of Formula (VII)

Formula (VII)

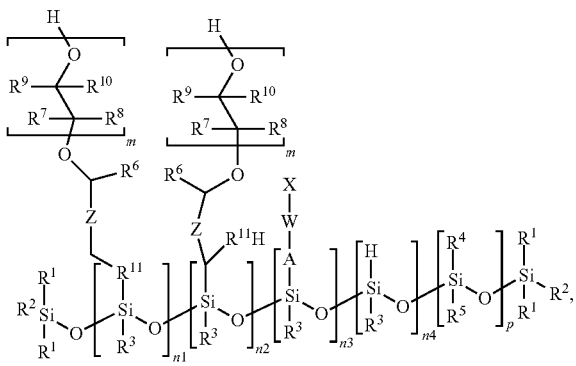

wherein:
$R^1$ to $R^{11}$, Z, n1, n2, p and m are the same as defined for the Formula (VI);
A is a heteroatom, preferably O or S, or a heteroatom-containing group, preferably $NR^{12}$ or $PR^{12}$, where $R^{12}$ is selected from hydrogen, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom;
W is selected from a linear, branched or cyclic hydrocarbon residue having 2 to 60 carbon atoms which may contain at least one heteroatom;
X is selected from halogen atoms, pseudohalogen groups, polyatomic groups resulting from the replacement of a proton in oxoacids, polyatomic groups resulting from the replacement of a proton in organic acids, preferably selected from halogen atoms or pseudohalogen groups;
n3 is from 1 to 1000, preferably from 2 to 500, more preferably from 5 to 100; and n4 is an integer from 0 to 10, preferably from 0 to 5, more preferably from 0 to 2, most preferably from 0 to 1, Formula (VIII)

wherein:
X is the same as defined for the Formula (VII); and
$R^b$ is selected from the group consisting of hydrogen or a linear, branched or cyclic hydrocarbon residue having 1 to 20 carbon atoms which may contain at least one heteroatom, and
d) nucleophilic substitution of the X on the polymer of Formula (VII) by a nucleophile containing at least one atom selected from the 15$^{th}$ or 16$^{th}$ group of the periodic table, preferably N, P, As, O, S or Se, preferably in the absence of a catalyst.

The different siloxane subunits n, n1, n2, n3, n4 and p are not necessarily present in the order illustrated herein. The subunits n, n1, n2, n3, n4 and p can be randomly distributed in the siloxane backbone in every possible combination.

The preferred embodiments with regard to $R^1$, $R^2$, $R^3$, $R^4$, $R^5$, $R^7$, $R^8$, $R^9$, $R^{10}$, $R^{11}$, Z, A, W, n1, n2, n3, n4, p and m are as defined above.

In Formulas (VII) and (VIII), X is selected from halogen atoms, preferably Br, I, or Cl, pseudohalogen groups, preferably selected from CN, $N_3$, OCN, NCO, SCN, or NCS; polyatomic groups resulting from the replacement of a proton in oxoacids, preferably selected from nitro, perchloro, phospho, sulfo, sulfito or thiosulfate; or polyatomic groups resulting from the replacement of a proton in organic acids, preferably selected from acetyl, formyl, benzyl, or oxalyl. In preferred embodiments, X is selected from halogen atoms or pseudohalogen groups, more preferably selected from Br, I, Cl, CN, $N_3$, OCN, NCO, SCN, or NCS. In particularly preferred embodiments, X is selected from Br, I, or Cl, in particular Br or I, most preferably Br.

In step a), by reacting a hydroxyalkyl allyl ether of Formula (III) with a polyhydridosiloxane of Formula (IV), hydroxyl-functionalized polysiloxane prepolymers of Formula (II) having a linear adduct represented by the siloxane subunit n1 and/or a branched adduct represented by the siloxane subunit n2 can be created. In the linear adduct, the SiH moiety is converted to Si—$R^{11}$—$CH_2$—Z—($R^6$)OH, while in the branched adduct, the SiH moiety is converted to Si—CH($R^{11}$H)—Z—($R^6$)OH. The linear adduct and the branched adduct can be randomly distributed in the siloxane backbone, with the ratio of n1 to n2 depending on the catalyst used.

The polyhydridosiloxane of Formula (IV) contains —Si($R_4$)($R_5$)O— units, e.g., dimethylsiloxane units, in the backbone. The ratio between —Si(H)($R_3$)O— units and —Si($R_4$)($R_5$)O— units can be varied.

Importantly, the above hydrosilylation reaction of the step a) is performed under anhydrous conditions and under catalysis, wherein the catalyst used is a transition metal catalyst of which the transition metal is selected from Groups 8 to 10 of the Periodic Table and more usually from the group consisting of ruthenium, rhodium, palladium, osmium, iridium, platinum and combinations thereof.

As illustrative but non-limiting examples of such catalysts may be mentioned: platinum catalysts, such as platinum black powder, platinum supported on silica powder, platinum supported on alumina powder, platinum supported on carbon powder (e.g., activated carbon), chloroplatinic acid, 1,3-divinyltetramethyldisiloxane complexes of platinum, carbonyl complexes of platinum and olefin complexes of platinum; palladium catalysts, such as palladium supported on silica powder, palladium supported on alumina powder, palladium supported on carbon powder (e.g., activated carbon), carbonyl complexes of palladium and olefin complexes of palladium; ruthenium catalysts, such as $RhCl_3(Bu_2S)_3$, ruthenium 1,3-ketoenolate and ruthenium carbonyl compounds such as ruthenium 1,1,1-trifluoroacetylacetonate, ruthenium acetylacetonate and triruthinium dodecacarbonyl; and, rhodium catalysts, such as rhodium supported on silica powder, rhodium supported on alumina powder, rhodium supported on carbon powder (e.g., activated carbon), carbonyl complexes of rhodium and olefin complexes of rhodium. Preferred catalysts take the form of said transition metals supported on a powder such as alumina, silica, or carbon; platinum supported on carbon powder is particularly preferred for use as the catalyst in the present method.

Without intention to limit the catalytic amount of the transition metal catalysts used in synthesis step a) of this embodiment, typically the catalyst is used in an amount that provides from 0.0001 to 1 gram of catalytic metal per equivalent of silicon-bonded hydrogen in the siloxane.

Upon completion of the reaction of the step a), it is facile to remove any solid, suspended compounds by, for example, filtration, crossflow filtration or centrifugation. Further, the reaction product may be worked up, using methods known in the art, to isolate and purify the product. For example, any solvent present may be removed by stripping at reduced pressure.

In the step b), the "grafting from" polymerization of at least one alkylene oxide monomer onto a polysiloxane backbone in the presence of a catalyst, preferably DMC catalyst, as define herein.

Exemplary alkylene oxides used in step b) are: ethylene oxide, 1,2-propylene oxide, epichlorohydrin, 1,2-butylene oxide, 1,2-pentylene oxide, isopentylene oxide, 1,2-hexylene oxide, 1,2-heptylene oxide, styrene oxide, cyclohexene oxide, methylglycidyl ether, ethylglycidyl ether, allylglycidyl ether, phenylglycidyl ether, butadiene monooxide, isoprene monooxide, tolylglycidyl ether, cyclohexene oxide, cyclooctane epoxide, cyclododecane epoxide, (+)-cis-limonene oxide, (+)-cis, trans-limonene oxide and (−)-cis, trans-limonene oxide; preferred for this invention are ethylene oxide, 1,2-propylene oxide, commonly referred simply as propylene oxide, 1,2-butylene oxide, 2,3-butylene oxide, styrene oxide and cyclohexene oxide. Particular preference is given to using propylene oxide.

In case more than one alkylene oxide monomer are used, each $R^7$, $R^8$, $R^9$ and $R^{10}$ may be independently selected. In such a case, each $R^7$, $R^8$, $R^9$ and $R^{10}$ in Formula (I) are independently selected in each unit m.

Suitable catalysts, which may be used individually or in admixture, include: alkali metal hydroxides such as KOH, NaOH and CsOH; alkaline earth metal hydroxides, such as $Ca(OH)_2$ and $Sr(OH)_2$; alkali metal alkoxides, such as KOMe, NaOMe, KOt-Bu and NaOt-Bu; alkali earth metal alkoxides, such as $Ca(OMe)_2$ and $Sr(OMe)_2$; and double metal cyanide catalyst.

In step b), the catalysts can typically be employed in an amount of from 0.05 to 0.5 wt. %, based on the total weight of the reactants and can be used either as solids, solutions or suspensions. It is also possible to add only part of the catalyst at the beginning of the reaction and introduce further catalysts in one or more portions at a later point in time; the later added fraction of catalyst may be identical or different to the initial catalyst and the amount of solvent present at each addition of catalyst can be moderated to ensure the efficacy of catalyst.

In preferred embodiments the reaction in step b) is catalyzed by a double metal cyanide (DMC) catalyst. Double metal cyanide catalyst complexes and the methods by which such complexes may be prepared are known in the art. The attention of the reader may, for example, be directed to: US 2008/0167502 (BASF); US 2003/0158449 (Bayer); US 2003/0069389 (Shell); US 2004/0220430 (Repsol Quimica); US 2005/0065383 (Dow); WO2012/136657 A1 (Henkel AG & Co. KGaA); EP0894108 (Arco); U.S. Pat. No. 5,767,323 (Yiannakis et al.); and, U.S. Pat. No. 5,536,883 (Arco).

The amount of DMC catalyst required for the synthesis of the hydroxyl-functionalized polysiloxane polyalkyleneglycol brush copolymer according to the present invention is preferably in the range of 10 to 5000 ppm, most preferably between 50 to 500 ppm, based on the weight of the final product.

The reaction of the step b) can be carried out at a reaction temperature in the range of from 0 to 250° C., preferably from 50 to 130° C., and/or at a reaction pressure from 0.001 to 50 bar, preferably from 0.5 to 5 bar.

If desired, the oxyalkylation may be carried out in a suitable solvent, such as an aromatic hydrocarbon—illustratively toluene or benzene—or, alternatively, an aliphatic hydrocarbon solvent having from 5 to 12 carbon atoms, such as heptane, hexane or octane. Where solvents are used, aliphatic solvents are preferred in order to obviate the potential toxic associations connected with use of aromatic hydrocarbon solvents.

By virtue of the "grafting from" polymerization, the second reaction step b) offers the opportunity to have a complete control of the number of alkoxylated side-chains in the polysiloxane backbone, as well as the complete control of degree of polymerization of polyether side chains. In addition to that, low molecular weight by-products can be avoided. The synthetic pathway according to the present invention is selective towards the obtained product without any side reactions. The degree of polymerization of the side-chains can be calculated and controlled with the amount of alkylene oxide used. Thus, a complete control of the desired molecular mass is possible with low polydispersity. The calculated molecular masses are in good agreement with those measured experimentally. Furthermore, the presented invention gives the opportunity to vary molecular masses after the reaction is finished due to the fact that the end groups of the side-chains can be activated again. Thus, the chain lengths of side-chains can be increased on demand.

The reaction step c) according to the present invention can be catalyzed by at least one metal catalyst, preferably selected from platinum catalysts or a palladium catalysts, more preferably platinum catalysts. The platinum catalyst can be selected from the group consisting of chloroplatinic acids, preferably hexachloroplatinic acid; alcohol modified chloroplatinic acids; olefin complexes of chloroplatinic acid; complexes of chloroplatinic acid and divinyltetramethyldisiloxane; fine platinum particles adsorbed on carbon carriers; platinum supported on metal oxide carriers, preferably $Pt(Al_2O_3)$; platinum black; platinum acetylacetonate; platinous halides, preferably $PtCl_2$, $PtCl_4$, $Pt(CN)_2$; complexes of platinous halides with unsaturated compounds, preferably ethylene, propylene, and organovinylsiloxanes; styrene hexamethyldiplatinum; platinum divinyltetramethyldisiloxane complex; the reaction product of chloroplatinic acid and an unsaturated aliphatic group-containing organosilicon compound; and a neutralized complex of platinous chloride and divinyltetramethyldisiloxane.

In preferred embodiments, the platinum catalyst is hexachloroplatinic acid, commonly referred to as Speier's catalyst, which is described in U.S. Pat. Nos. 2,823,218 and 3,923,705, or Karstedt's catalyst, which is described in U.S. Pat. Nos. 3,715,334 and 3,814,730. Karstedt's catalyst is a platinum divinyltetramethyldisiloxane complex typically containing about one-weight percent of platinum in a solvent such as toluene.

In preferred embodiments, the platinum catalyst is present in an amount of from 0.0001 mol % to 10 mol %, more preferably 0.001 mol % to 0.1 mol %, of platinum based on the molar quantity of silicon-bonded hydrogen in the polysiloxane.

Exemplary heterocyclic compounds used in the reaction step c) are: ethylene oxide, 1,2-propylene oxide, tetrahydrofuran, 2-Methyltetrahydrofuran, oxetane, oxetene, tetrahydropyrane, oxepane, 1,4-dioxane, crown ethers, epichlorhydrin, 1,2-butylene oxide, 2,3-butylene oxide, 1,2-pentylene oxide, isopentylene oxide, 1,2-hexylene oxide, 1,2-heptylene oxide, styrene oxide, cyclohexene oxide, methylglycidyl ether, ethylglycidyl ether, allylglycidyl ether, phenylglycidyl ether, butadiene monoxide, isoprene monoxide, tolylglycidyl ether, cyclohexene oxide, cyclooctanee epoxide, cyclododecane epoxide, (+)-cis-limonene oxide, (+)-cis, trans-limonene oxide and (−)-cis, trans-limonene oxide, lactones, such as β-propiolactones, γ-butyrolactones, D-glucono-δ-lactones or ε-caprolactones, dilactones, lactams, lactides and thiolactones, thiolane, other heterocyclic rings such as piperidine, pyrroline or pyrrolidine, aziridine, azirine, oxirene, thiirane (episulfides), thiirene, phosphirane, phosphirene, azetidine, azete, thietane and thiete.

Particularly preferred for this invention are 1,2-propylene oxide, 1,2-butylene oxide, 2,3-butylene oxide, styrene oxide, cyclohexene oxide, tetrahydrofuran, tetrahydropyrane, oxepane, 1,4-dioxane, ε-caprolactones, thiolane and crown ethers. In particular, tetrahydrofuran is preferred.

In preferred embodiments, in step c) the SiH groups are substantially completely halosilated to form halogen-functionalized side groups, which are quaternized in the reaction step d). Preferably, the bi-functionalized polysiloxane prepolymer contains less than 500 ppm mol %, preferably less than 10 ppm mol %, more preferably less than 2 ppm mol %, of SiH moiety based on the total moles of the silicon atom which constitutes the polysiloxane backbone.

Suitable nucleophiles used in the reaction step d) are amines, phosphines, arsanes, ethers, alcohols, thiols, sulfides, selenium-containing molecules.

Exemplary amines are: primary amines, such as methylamine or ethylamine, secondary amines, such as dimethylamine or diethylamine, tertiary amines, such as trimethylamine or trimethylamine, pyridine, piperidine, pyrrole, pyrroline, pyrrolidine, imidazole, 1-methyl-1H-imidazole, 1-butyl-1H-imidazole, pyrazole, pyrimidine, triazole, triazine, indole, quinoline, purine, such as adenine, guanine, hypoxanthine, xanthine, theobromine, caffeine, uric acid or isoguanine, and porphyrin; preferred for this invention are trimethylamine, triethylamine, pyridine, 1-methyl-1H-imidazole, and 1-butyl-1H-imidazole.

Exemplary phosphines are organophosphines such as methylphosphine, dimethylphosphine, trimethylphosphine, phenylphosphine, diphenylphosphine, triphenylphosphine or cyclic phosphines, such as phosphiranes, phosphirenes, phospholanes, phosphole and phosphinanes.

Exemplary arsanes are monoarsanes, diarsanes or triarsanes with different alkyl chains or heterocycles, such as arsolane and arsole.

Exemplary ethers are ethylene oxide, 1,2-propylene oxide, tetrahydrofuran, furan, tetrahydropyran, pyran, oxirene, oxetane, oxete, oxepane, oxepine, 1,4-dioxane, crown ethers, epichlorohydrine, 1,2-butyleneoxide, 1,2-pentylenoxide, isopentylenoxide, 1,2-hexylenoxide, 1,2-heptylenoxide, styrene oxide, cyclohexene oxide, methylglycidyl ether, ethylglycidyl ether, allylglycidyl ether, phenylglycidyl ether, butadiene monooxide, isoprene monooxide, tolylglycidyl ether, cyclohexenoxide, cyclooctanepoxide, cyclododecanepoxide, (+)-cis-limonenoxide, (+)-cis, trans-limonenoxide and (−)-cis, trans-limonenoxide.

Exemplary alcohols are methanol, ethanol, propan-1-ol, butan-1-ol, pentan-1-ol, hexan-1-ol, heptan-1-ol, octan-1-ol, nonan-1-ol, decan-1-ol, undecan-1-ol, dodecan-1-ol, tridecan-1-ol, tetradecan-1-ol, pentadecan-1-ol, hexadecan-1-ol, octadecan-1-ol, hexacosan-1-ol, triacontan-1-ol, propan-2-ol, butan-2-ol, 2-methylpropan-1-ol, 2-methylpropan-2-ol, pentan-2-ol, pentan-3-ol, 2-Methylbutan-1-ol, 3-methylbutan-1-ol, 2-methylbutan-2-ol, 3-methylbutan-2-ol, 2,2-dimethylpropan-1-ol, ethan-1,2-diol, propan-1,2-diol, propan-1,3-diol, butan-1,2-diol, butan-1,3-diol, butan-1,4-diol, butan-2,3-diol, pentan-1,5-diol, hexan-1,6-diol, octan-1,8-diol, nonan-1,9-diol, decan-1,10-diol, propan-1,2,3-triol, cyclopentanol, cyclohexanol, prop-2-en-1-ol, but-2-en-1-ol, (hydroxymethyl)benzol, 1-phenylethan-1-ol, 2-phenylethan-1-ol, diphenylmethanol, triphenylmethanol, phenol, cyclopentanol and cyclohexanol.

Exemplary sulfides are: sulfates and sulfites; thioethers, such as dimethyl sulfide, methyl phenyl sulfide, diethyl sulfide, methyl ethyl sulfide or diphenyl sulfide; thiophenes, such as thiiranes or thiirenes, thietanes or thietes, dithietanes or dithietes, tetrahydrothiophene or thiophene, dithiolane, dithiane and trithiane.

Exemplary selenium containing molecules are: selenols (RSeH), such as selenaphenol; selenyl halides, such as phenylselenyl bromide; selenoethers (R—Se—R), such as dimethylselenide, ethylmethylselenide, diethylselenide, methylpropylselenide, methylbutylselenide, butylethylselenide or ethylpropylselenide; and seleniranes.

The ionization/derivatization reaction can take place in solvent free conditions, as well as in polar and non-polar solvents, such as alcohols, aromatic or aliphatic alkanes, alkenes or alkynes, halogenated aromatic or aliphatic hydrocarbons and hydrocarbons containing heteroatoms, such as O, N, S, P, Cl, Br or F. Preferably, the reaction takes place in solvents such as toluene, THF, heptane, hexane, chloroform, ethyl acetate, acetone or ethanol. Any residual solvent is preferably removed after the completion of the reaction.

The yield of the provided procedure is higher than 80%, preferably higher than 90% and most preferably higher than 99%, calculated by subtracting the wt. % of the residual starting materials after the synthesis.

The bi-functionalized polysiloxane brush copolymer according to the invention can impart the surface properties that can inhibit microbial fouling and antimicrobial properties to compositions comprising said bi-functionalized polysiloxane brush copolymer. Preferably, the compositions are adhesive, coating, or sealant materials.

In preferred embodiments, the curable composition according to the invention comprises
a) at least one polymer having at least one silicon-containing group of Formula (A):

(A), wherein:
each $R^1$ is independently selected from a hydrocarbon residue containing 1 to 20 carbon atoms or a triorganosiloxane group of formula —O—Si$(R^2)_3$, wherein each $R^2$ is independently selected from a hydrocarbon residue containing 1 to 20 carbon atoms;
each Y is independently selected from a hydroxy group or a hydrolysable group; and
k is 0, 1 or 2, and
b) at least one bi-functionalized polysiloxane brush copolymer according to the invention.

There are no special limitations on the polymer backbone of the at least one polymer a), and all known polymers having various types of main chain backbones may be used. In various embodiments, polymer a) is therefore selected from alkyd resins, (meth)acrylate polymers and (meth)acrylamide polymers and the salts thereof, phenolic resins, polyalkylenes, polyamides, polycarbonates, polyols, polyethers, polyesters, polyurethanes, vinyl polymers, polysiloxanes, and copolymers composed of at least two of the above-mentioned polymer classes.

Polyols/polyethers, in particular polyethylene oxide and/or polypropylene oxide, or polysiloxanes are particularly preferably used.

According to another preferred embodiment of the composition according to the invention, the molecular weight Mn of the polymer backbone is between 500 and 100,000 g/mol. Molecular weight ranges of 5000 to 25,000 g/mol are particularly preferred, and of 8000 to 20,000 g/mol are very particularly preferred. These molecular weights are particularly advantageous, since compositions with these molecular weights have viscosities which facilitate processing. The polymers may be straight-chain or branched in each case.

The silicon-containing group of Formula (A) as defined herein is a reactive group in which a hydroxy group or a hydrolysable group is bound to the silicon atom, and which is capable of crosslinking by forming a siloxane bond. This crosslinking reaction may be accelerated by a silanol condensation catalyst.

The reactive group has the above-described Formula (A): —Si$(R^1)_k(Y)_{3-k}$, wherein each $R^1$ is independently selected from a hydrocarbon residue containing 1 to 20 carbon atoms or a triorganosiloxane group of formula —O—Si$(R^2)_3$, wherein each $R^2$ is independently selected from a hydrocarbon residue containing 1 to 20 carbon atoms; each Y is independently selected from a hydroxy group or a hydrolysable group; and k is 0, 1, or 2, preferably 1 or 2. In various embodiments, each $R^1$ is independently selected from the group consisting of vinyl group, an alkyl group containing 1 to 20 carbon atoms, an aryl group containing 6 to 20 carbon atoms, an aralkyl group containing 7 to 20 carbon atoms, and a triorganosiloxane group of formula —O—Si$(R^2)_3$ as defined above. If multiple Y radicals are contained, these may be the same or different.

Examples of hydrolysable group Y includes, but are not limited to, a hydrogen atom, a halogen atom, an alkoxy group, an acyloxy group, an oxime group, an acetoxy group, a lactate group, a malate group, an amino group, an amide group, an acid amide group, an aminoxy group, a mercapto group, an alkenyloxy group, and the like. Alkoxy groups, in particular a methoxy, ethoxy, or isopropoxy group, more preferably a methoxy group, and oxime groups, acetoxy groups and lactate groups are particularly preferred. The term "oxime groups" as used herein includes ketoximes and aldoximes, and refers in general to groups which contain the functional group R'$_2$C═N—O—, wherein the oxygen atom is bound to the silicon atom, and R' may be H or another group, preferably an alkyl group.

Examples of $R^1$ in Formula (A) described above include a vinyl group, alkyl groups, preferably a methyl group and an ethyl group, cycloalkyl groups, preferably a cyclohexyl group, aryl groups, preferably a phenyl group, aralkyl groups, preferably a benzyl group, and a trimethylsiloxy group. In particular preferred embodiments, $R^1$ in Formula (A) is selected from a vinyl group or a methyl group.

Specific examples of the reactive silicon-containing groups include dimethoxyvinylsilyl, dimethoxymethylsilyl, diethoxymethylsilyl, trimethoxysilyl, and diisopropoxymethylsilyl groups.

In various embodiments, one polymer molecule in each case contains two or more of the above-described reactive groups.

Methods for inserting reactive silicon-containing groups, preferably end groups, into polymers are well known in the prior art.

The reactive silicon-containing group may be situated on one or both ends of the main chain, within the main chain, or within or on the end of one or more side chains.

In preferred embodiments, the quantity of the reactive polymer a) described herein may be 1 to 99% by weight, preferably 30 to 90% by weight, based on the total weight of the curable composition.

As polymer component a), the above-described polymers may be used in each case either alone or in combinations of two or more thereof. If combinations of two or more polymers are used, the polymers that are used may differ in their monomer composition and/or their molecular weight.

In preferred embodiments, the quantity of the bi-functionalized polysiloxane brush copolymer b) described herein may be 0.001 to 90% by weight, preferably 0.01 to 50% by weight, more preferably 0.1 to 20% by weight, based on the total weight of the curable composition.

In various embodiments, the curable composition additionally comprises at least one compound selected from the group comprising plasticizers, stabilizers, fillers, reactive diluents, drying agents, adhesion promoters, UV stabilizers, rheological aids, solvents, catalysts, and mixtures thereof.

The curable composition according to the invention is produced according to known methods by intimately mixing the components in suitable dispersion units, for example a high-speed mixer.

The bi-functionalized polysiloxane brush copolymer according to the invention can be used in an adhesive, sealant, or coating material for the modification of surface energies and/or as an antimicrobial agent, preferably against molds, yeasts, fungi, gram-positive bacteria, or gram-negative bacteria.

Various features and embodiments of the disclosure are described in the following examples, which are intended to be representative and not limiting.

EXAMPLES

Example 1: Preparation of 1-(allyloxy)propan-2-ol

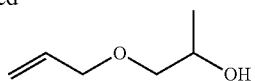

In a 1 L autoclave equipped with dosage system, 637.5 g (10.98 mol) of allyl alcohol were placed. Under argon flow, Na (2.9% mol) was added into the vessel. The mixture was stirred at room temperature until the gas evolution ceased. Then the autoclave was closed and heated until 110° C. In the next step propylene oxide (PO) was dosed (520 ml, dosage rate 1.25 g/min). After the completion of the addition of PO it was allowed to cool to room temperature and the reaction mixture was stirred overnight. A yellow transparent mixture was obtained. The mixture was neutralized using HCl (solution 37% in water) and dried with $Na_2SO_4$. The mixture was filtrated trough celite and distilled under vacuum (100 mbar, 85-95° C.). The product was obtained with good yield (70-75%) and the structure was confirmed by NMR spectroscopy and mass spectrometry.

Example 2: Preparation of Poly(3-(2-hydroxy-propoxy)propyl)methylsiloxane-co-polyhydridom-ethyl-co-polydimethylsiloxane

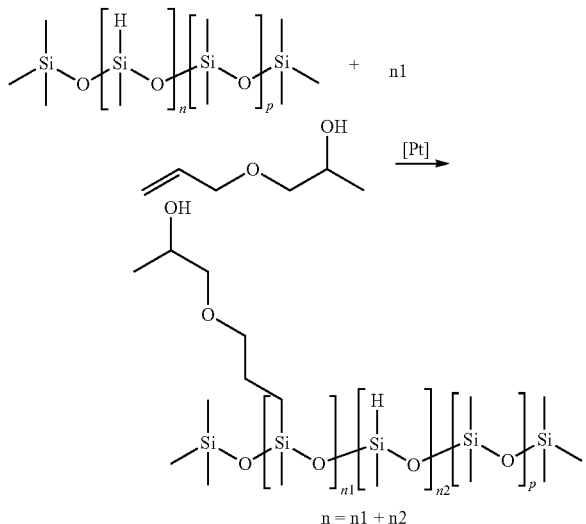

n = n1 + n2

A 500 ml three neck round bottomed flask was degassed under high vacuum ($1^{-3}$ mbar) and flushed with argon. Then, 120 µL of Karstedt (2% of Pt in the catalyst, 0.1% mol in the mixture) and toluene (200 ml, dried over molecular sieves) were added into the flask under argon atmosphere and stirred at room temperature (20° C.) for a couple of minutes. Then 1-(allyloxy)propan-2-ol (from Example 1; 5.73 ml) was added into the system. (25-35% Methylhydrosiloxane)-dimethylsiloxane copolymer (20.4 mL, Mn 3800 g/mol) were added dropwise. The mixture was stirred and refluxed (oil bath temperature: 120° C.) under inert atmosphere (Ar) until 50% conversion of the SiH groups was achieved (the reaction was followed by $^1$H-NMR). The mixture (when necessary) was decolorized by adding activated carbon and an excess of pentane and stirred for 16 h at room temperature. The crude was filtrated trough celite, and the solvents and volatiles were evaporated under vacuum. The obtained product (yield 84%) was a colorless, transparent viscous liquid. The molecular weight and structure of the product was confirmed by GPC (Mn=7891 g/mol, PDI 4.532) and NMR spectroscopy.

Example 3: Preparation of Poly(3-(2-hydroxy-propoxy)propyl)methylsiloxane-co-polyhydridom-ethyl-co-polydimethylsiloxane

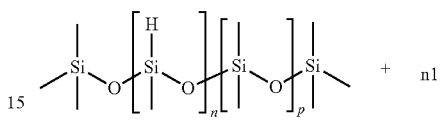

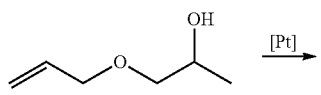

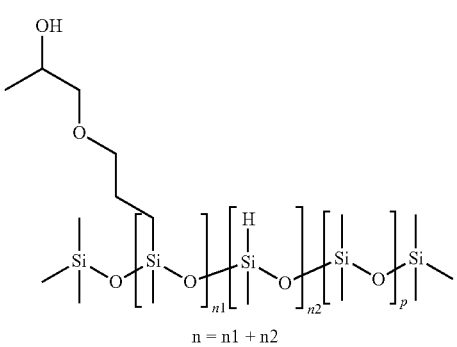

n = n1 + n2

A 100 ml three neck round bottomed flask was degassed under high vacuum ($1^{-3}$ mbar) and flushed with argon. Then, 60 mg of Platinum supported on charcoal (10% of Pt in the catalyst, 0.5% mol in the mixture compared to siloxane starting material) and toluene (40 ml, dried over molecular sieves) were added into the flask under argon atmosphere and stirred at room temperature (20° C.) for a couple of minutes. Then 1-(allyloxy)propan-2-ol (the product from Example 1; 1.42 mL) was added into the system. (25-35% Methylhydrosiloxane)-dimethylsiloxane copolymer (5.1 mL, Mn 3800 g/mol) were added dropwise. The mixture was stirred (oil bath temperature: 100° C.) under inert atmosphere (Ar) until 50% conversion of the SiH groups was achieved (the reaction was followed by $^1$H-NMR). The mixture (when necessary) was decolorized by adding activated carbon and an excess of pentane and stirred for 16 h at room temperature. The crude was filtrated trough celite, and the solvents and volatiles were evaporated under vacuum. The obtained product (yield 75%) was a colorless, transparent viscous liquid. The molecular weight and structure of the product was confirmed by GPC (Mn=5929 g/mol, PDI 2.645) and NMR spectroscopy.

Example 4: Preparation of Polydimethylsiloxane-graft-poly(propyleneoxide)-co-polyhydridomethylsiloxane

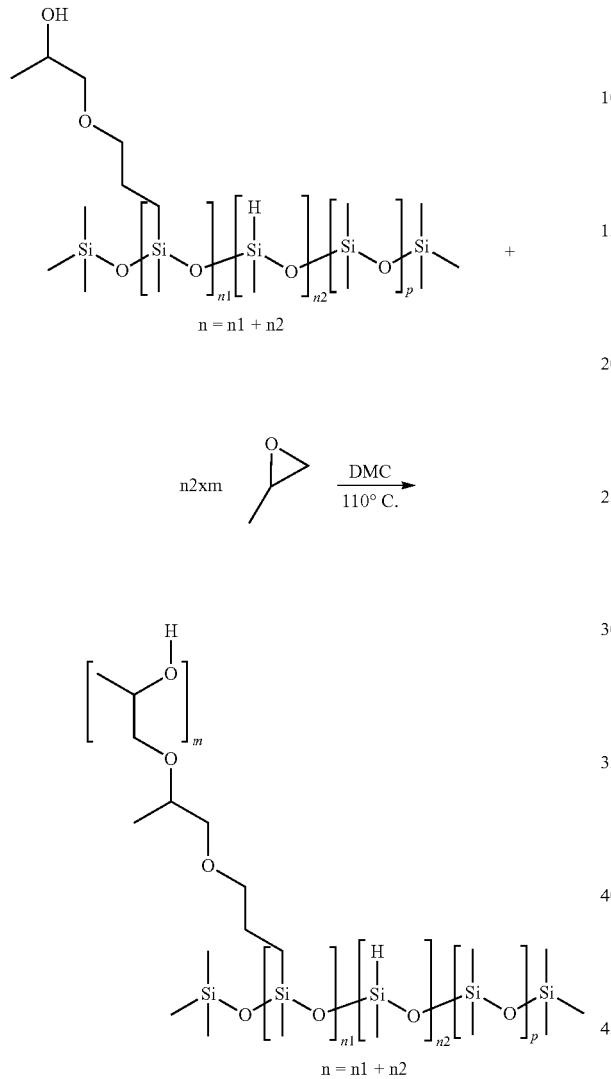

Example 5: Preparation of Polydimethylsiloxane-co-poly(3-(2-hydroxypropoxy)propyl)methylsiloxane-co-poly(3-(4-bromobutoxy))methylsiloxane

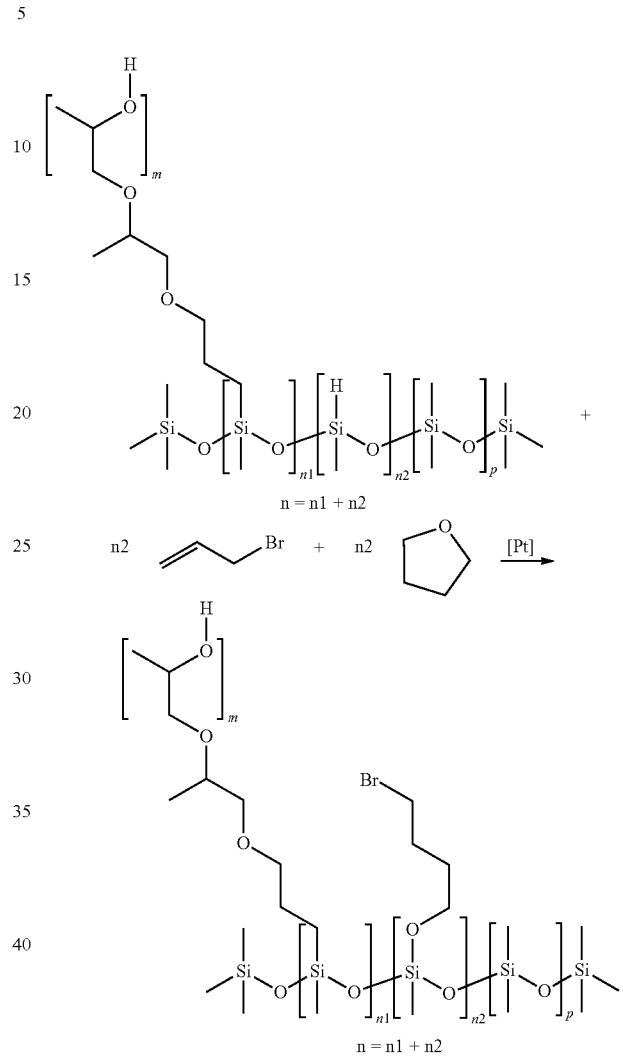

5.0 g of (3-(2-hydroxypropoxy)propyl)methylsiloxane-co-polyhydridomethyl-co-polydimethylsiloxane (from Example 2, Mn=7891 g/mol, PDI 4.532) were charged together with 0.015 g of the DMC catalyst (170 ppm based on the amount of the copolymer) and 20.0 g heptane in a 100 mL-stirring Autoclave. The reaction mixture was stirred at room temperature with constant stirring at 350 rpm for several minutes under vacuum (0.001 bar) and argon atmosphere (1 bar). Then the reaction temperature was increased at 110° C. After reaching this temperature, 3.5 mL propylene oxide (PO) were added to the reaction mixture and stirred constantly at 350 rpm. After filtration (when necessary) the solvent and traces of unreacted monomer were removed under vacuum (0.001 bar) for three hours. The yield of the product was found to be 89%. The product is milky, colorless, viscos liquid. The molecular weight and structure of the product was confirmed by GPC (Mn=8500 g/mol, PDI 3.722) and NMR spectroscopy.

A 100 ml three neck round bottomed flask was degassed under high vacuum ($1^{-3}$ mbar) and flushed with argon. Poly((hydroxyl)-polypropylenglycol)methylsiloxane-co-polyhydridomethyl-co-polydimethylsiloxane (6.5 g, Mn 6411 g/mol, PDI 4.484) was added. Then THF (20 mL, dried over molecular sieves) and allyl bromide (0.52 mL, 97%) were added into the flask under argon atmosphere and stirred at room temperature (20° C.) for a couple of minutes. Then, $PdCl_2$ (2 mg, 1.6 mol-% in the mixture) added into the system. The mixture was stirred (oil bath temperature: 50° C.) under inert atmosphere (Ar) until complete conversion of the SiH groups was achieved (the reaction was followed by $^1$H-NMR). The mixture (when necessary) was decolorized by adding activated carbon and an excess of pentane and stirred for 16 h at room temperature. The crude was filtrated trough celite, and the solvents and volatiles were evaporated under vacuum. The obtained product (yield >95%) was a yellow, milky, viscous liquid. The molecular weight and structure of the product was confirmed by GPC (Mn=6300 g/mol, PDI 3.434) and NMR spectroscopy. The elements were detected by EA.

Example 6: Preparation of Polydimethylsiloxane-graft-poly(propylene oxide)-co-poly(3-(4(methylsiloxane)butoxy)pyridinium Bromide

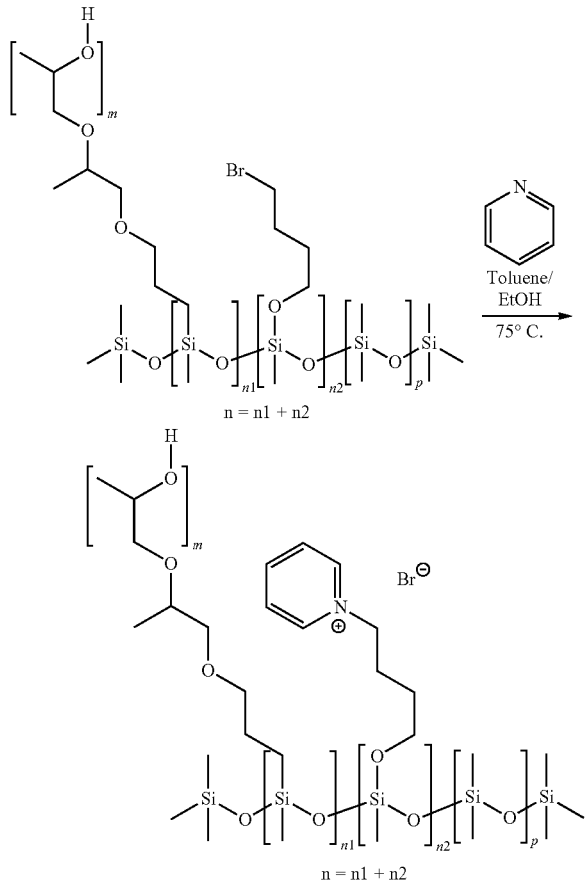

A 100 ml three neck round bottomed flask was degassed under high vacuum ($1^{-3}$ mbar) and flushed with argon. Poly((hydroxyl)-polypropylenglycol)methylsiloxane-co-poly(3-(4-bromobutoxy))methylsiloxane-co-polydimethylsiloxane (from Example 5, 7.3 g, Mn=6300 g/mol, PDI 3.434) was added. Then toluene (15 mL, dried over molecular sieves) and ethanol (15 mL, dried over molecular sieves) were added into the flask under argon atmosphere and stirred at room temperature (20° C.) for a couple of minutes. Then pyridine (0.5 mL, 99%) was added into the system. The mixture was stirred (oil bath temperature: 75° C.) under inert atmosphere (Ar) until complete quaternization was achieved (the reaction was followed by $^1$H-NMR). The solvents and volatiles were evaporated under vacuum. The obtained product (yield 84%) was a grey, milky, high viscous liquid. The molecular weight and structure of the product was confirmed by GPC (Mn=5167 g/mol, PDI 5.656) NMR spectroscopy. The elements were detected by EA.

Methods

NMR-Spectroscopy: All NMR measurements were done on a Bruker 300 MHz, 400 MHz and 600 MHz instrument with deuterated DMSO and methanol as solvent. All the samples were measured at room temperature (297 K). The chemical shifts are given in ppm. The calibration of the chemical shifts in 1H spectra was carried out by using the shifts of the deuterated solvents (DMSO-d6, δ H 2.49, 39.7; CD3OD, δ H 3.31, 49.0).

GPC: The molecular weights given in the present text refer to number average molecular weights (Mn), unless otherwise stipulated. All molecular weight data refer to values obtained by gel permeation chromatography (GPC) carried out using HP1090 II Chromatography with DAD detector (HEWLETT PACKARD) at 40° C. Tetrahydrofuran (THF) was used as an eluent. THF was passed through three PSS SDV gel columns with molecular weight ranges of 102, 103 and 104 g·mol$^{-1}$ with a flow rate of 0.9 ml·min$^{-1}$. The calibration of the device was carried out using polystyrene standards.

Elemental Analysis (EA): Elemental analyses were recorded with a Flash EA 1112 analyzer by Thermo Quest or with a C/H/N/S-micro analyzer TruSpec-932 by Leco. The determination of halogens was done with a potentiometric titration (analytical titration TIM 580 und TIM 870). Detection of silicon was done via atomic absorption spectrometry with Perkin-Elmer AAnalyst 300.

The invention claimed is:

1. A bi-functionalized polysiloxane brush copolymer, comprising:
   at least one hydroxyl-terminated polyalkyleneglycol side chain —[—S—B]; and
   at least one onium-functionalized side chain -[T-C], wherein:
   B represents hydroxyl-terminated polyalkyleneglycol side chain;
   S is a linker group wherein the moiety Si—C—C— of which said Si is a part of the polysiloxane backbone;
   C represents an onium-functionalized side chain;
   T is a linker group wherein the moiety of Si-heteroatom-C— of which said Si is a part of the polysiloxane backbone.

2. The bi-functionalized polysiloxane brush copolymer according to claim 1, wherein the polysiloxane backbone contains less than 500 ppm mol % of SiH moiety based on the total moles of the silicon atom which constitutes the polysiloxane backbone.

3. The bi-functionalized polysiloxane brush copolymer according to claim 1, wherein said copolymer has the number average molecular weight (Mn) of from 1000 to 200,000 g/mol.

4. The bi-functionalized polysiloxane brush copolymer according to claim 1, wherein said copolymer is represented by Formula (I)

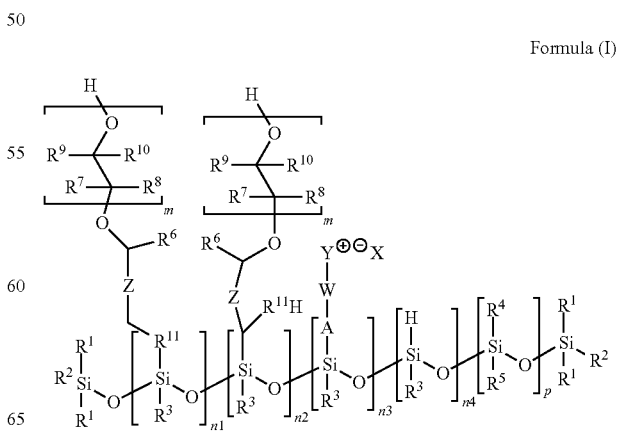

Formula (I)

wherein:
- Z is a covalent bond or selected from a polyoxyalkylene having a molecular weight of less than 10000 g/mol or a linear, branched or cyclic hydrocarbon residue having 1 to 20 carbon atoms which may contain at least one heteroatom;
- each $R^1$, $R^2$, $R^3$, $R^4$ and $R^5$ may be the same or different and are independently selected from a linear, branched or cyclic hydrocarbon residue having 1 to 20 carbon atoms which may contain at least one heteroatom, wherein $R^3$, $R^4$ and $R^5$ may be independently selected in each unit n1, n2, n3, n4, and p;
- $R^{11}$ is selected from a linear, branched or cyclic hydrocarbon residue having 1 to 20 carbon atoms which may contain at least one heteroatom;
- $R^6$ is selected from hydrogen or a linear, branched or cyclic hydrocarbon residue having 1 to 20 carbon atoms which may contain at least one heteroatom;
- $R^7$, $R^8$, $R^9$ and $R^{10}$ may be the same or different and in each unit m they are independently selected from hydrogen or a linear, branched or cyclic hydrocarbon residue having 1 to 20 carbon atoms which may contain at least one heteroatom;
- A is a heteroatom, or a heteroatom-containing group;
- W is selected from a linear, branched or cyclic hydrocarbon residue having 2 to 60 carbon atoms which may contain at least one heteroatom;
- Y is an onium cation;
- X is an anion selected from halide anions, pseudohalide anions, oxoanions, anions from organic acids or inorganic anions;
- n1 and n2 are an integer independently selected from 0 to 1000, with the proviso that not both of n1 and n2 are 0;
- n3 is an integer selected from 1 to 1000;
- n4 is an integer from 0 to 10;
- p is an integer from 0 to 1000; and
- m is an integer from 1 to 1500.

5. The bi-functionalized polysiloxane brush copolymer according to claim 4, wherein in Formula (I):
- Z is a covalent bond or selected from a $C_1$-$C_{20}$ alkylene group, a $C_6$-$C_{18}$ arylene group or a $C_6$-$C_{18}$ aralkylene group, which may contain at least one heteroatom; and/or
- $R^6$ is selected from a $C_1$-$C_{12}$ alkyl group, a $C_3$-$C_{10}$ cycloalkyl group, a $C_6$-$C_{18}$ aryl group or a $C_6$-$C_{18}$ aralkyl group, which may contain at least one heteroatom; and/or
- $R^{11}$ is $CR^a{}_2$ where each $R^a$ may be the same or different and is independently selected from hydrogen, a $C_1$-$C_{12}$ alkyl group, a $C_3$-$C_{10}$ cycloalkyl group, a $C_6$-$C_{18}$ aryl group or a $C_6$-$C_{18}$ aralkyl group, which may contain at least one heteroatom.

6. The bi-functionalized polysiloxane brush copolymer according to claim 4, wherein in Formula (I):
- A is selected from O, S, $NR^{12}$ or $PR^{12}$, where $R^{12}$ is selected from hydrogen, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom selected from O, N, S, P, Si, Cl, Br or F; and/or
- W is selected from a linear, branched or cyclic hydrocarbon residue having 2 to 20 carbon atoms, which may contain at least one heteroatom selected from O, N, S, P, Si, Cl, Br or F; and/or
- Y is an onium cation represented as $ER^cR^d$, wherein E is a positively charged atom selected from the 16$^{th}$ group of the periodic table, or $ER^cR^dR^e$ wherein E is a positively charged atom selected from the 15$^{th}$ group of the periodic table, wherein $R^c$, $R^d$ and $R^e$ may be the same or different and each is independently selected from hydrogen, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom selected from O, N, S, Si, Cl, Br or F; and/or
- X is an anion selected from halide anions selected from Br$^-$, I$^-$ or Cl$^-$; pseudohalide anions selected from cyanide (CN$^-$), azide (N$_3{}^-$), cyanate (OCN$^-$), isocyanate (NCO$^-$), thiocyanate (SCN$^-$), or isothiocyanate (NCS$^-$); oxoanions selected from nitrate, perchlorate, phosphate, sulfate, sulfite, or thiosulfate; anions from organic acids selected from acetate, formate, benzoate, or oxalate; or inorganic anions selected from Tf$_2$N$^-$, BF$_4{}^-$, SbF$_6{}^-$ or PF$_6{}^-$.

7. The bi-functionalized polysiloxane brush copolymer according to claim 4, wherein in Formula (I) each of $R^1$, $R^2$, $R^3$, $R^4$ and $R^5$ are independently selected from a $C_1$-$C_{12}$ alkyl group, a $C_3$-$C_{10}$ cycloalkyl group, a $C_6$-$C_{18}$ aryl group or a $C_6$-$C_{18}$ aralkyl group, which may contain at least one heteroatom.

8. The bi-functionalized polysiloxane brush copolymer according to claim 4, wherein in Formula (I)
- $R^7$, $R^8$ and $R^{10}$ are hydrogen; and
- $R^9$ is either a phenyl group or a $C_1$-$C_8$ alkyl group.

9. A method for preparing a bi-functionalized polysiloxane brush copolymer according to claim 1, comprising the steps of:
a) reacting a hydroxyalkyl allyl ether having a primary or secondary alcohol group with a polyhydridosiloxane under catalysis of a transition metal catalyst of which the transition metal is selected from Groups 8 to 10 of the Periodic Table to provide a hydroxyl-functionalized polysiloxane prepolymer having Formula (II),

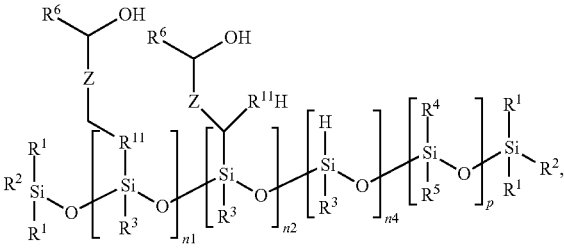

Formula (II)

wherein:
- Z is a covalent bond or selected from a polyoxyalkylene having a molecular weight of less than 10000 g/mol or a linear, branched or cyclic hydrocarbon residue having 1 to 20 carbon atoms which may contain at least one heteroatom;
- each $R^1$, $R^2$, $R^3$, $R^4$ and $R^5$ may be the same or different and are independently selected from a linear, branched or cyclic hydrocarbon residue having 1 to 20 carbon atoms which may contain at least one heteroatom, wherein $R^3$, $R^4$ and $R^5$ may be independently selected in each unit n1, n2, n4, and p;

R<sup>11</sup> is selected from a linear, branched or cyclic hydrocarbon residue having 1 to 20 carbon atoms which may contain at least one heteroatom;

R<sup>6</sup> is selected from hydrogen or a linear, branched or cyclic hydrocarbon residue having 1 to 20 carbon atoms which may contain at least one heteroatom;

n1 and n2 are an integer independently selected from 0 to 1000, with the proviso that not both of n1 and n2 are 0;

n4 is an integer from 1 to 1000; and p is an integer from 0 to 1000, said hydroxyalkyl allyl ether conforming to Formula (III), and

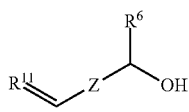

Formula (III)

wherein:

Z, R$^{11}$ and R$^{6}$ are the same as defined for Formula (II), said polyhydridosiloxane conforming to Formula (IV)

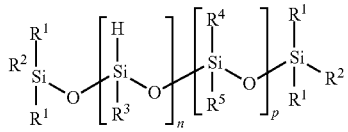

Formula (IV)

wherein:

R$^1$, R$^2$, R$^3$, R$^4$, R$^5$ and p are the same as defined for Formula (II); and n is n1+n2+n4, wherein n1, n2 and n4 are the same as defined for Formula (II), b) in the presence of the obtained hydroxyl-functionalized polysiloxane prepolymer of Formula (II) and a catalyst, performing a ring-opening polymerization of at least one alkylene oxide monomer having Formula (V) to obtain a SiH-containing polysiloxane-g-polyalkenylglycol brush polymer of Formula (VI)

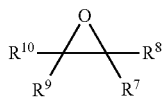

Formula (V)

wherein:

each R$^7$, R$^8$, R$^9$ and R$^{10}$ may be the same or different and are independently selected from hydrogen or a linear, branched or cyclic hydrocarbon residue having 1 to 20 carbon atoms which may contain at least one heteroatom,

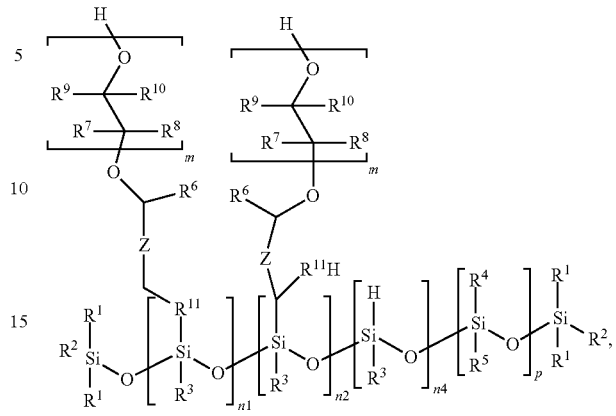

Formula (VI)

wherein:

R$^1$ to R$^{11}$, Z, n1, n2, n4, p and m are the same as defined for Formulas (II) to (V), c) reacting the obtained SiH-containing polysiloxane-g-polyalkenylglycol brush polymer of Formula (VI), at least one heterocyclic compound, and at least one compound of Formula (VIII) in the presence of at least one metal catalyst to obtain a polymer of Formula (VII)

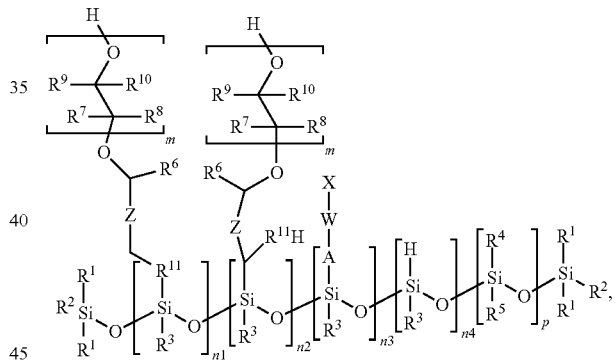

Formula (VII)

wherein:

R$^1$ to R$^{11}$, Z, n1, n2, p and m are the same as defined for the Formula (VI);

A is a heteroatom, or a heteroatom-containing group;

W is selected from a linear, branched or cyclic hydrocarbon residue having 2 to 60 carbon atoms which may contain at least one heteroatom;

X is selected from halogen atoms, pseudohalogen groups, polyatomic groups resulting from the replacement of a proton in oxoacids, polyatomic groups resulting from the replacement of a proton in organic acids;

n3 is from 1 to 1000;

n4 is an integer from 0 to 10,

Formula (VIII)

wherein:

X is the same as defined for the Formula (VII); and $R^b$ is selected from the group consisting of hydrogen or a linear, branched or cyclic hydrocarbon residue having 1 to 20 carbon atoms which may contain at least one heteroatom, and d) nucleophilic substitution of the X on the polymer of Formula (VII) by a nucleophile containing at least one atom selected from the 15$^{th}$ or 16$^{th}$ group of the periodic table, optionally in the absence of a catalyst.

10. The method according to claim 9, wherein the catalyst of step b) is an alkoxylation catalyst selected from the group consisting of alkali metal hydroxides, alkali earth metal hydroxides, alkali metal alkoxides, alkali earth metal alkoxides, and double metal cyanide complex.

11. The method according to claim 9, wherein the catalyst of step c) is a platinum catalyst or palladium catalyst; and/or the heterocyclic compound used in step c) is selected from the group consisting of ethylene oxide, 1,2-propylene oxide, tetrahydrofuran, 2-Methyltetrahydrofuran, oxetane, oxetene, tetrahydropyrane, oxepane, 1,4-dioxane, crown ethers, epichlorhydrin, 1,2-butylene oxide, 2,3-butylene oxide, 1,2-pentylene oxide, isopentylene oxide, 1,2-hexylene oxide, 1,2-heptylene oxide, styrene oxide, cyclohexene oxide, methylglycidyl ether, ethylglycidyl ether, allylglycidyl ether, phenylglycidyl ether, butadiene monoxide, isoprene monoxide, tolylglycidyl ether, cyclohexene oxide, cyclooctanee epoxide, cyclododecane epoxide, (+)-cis-limonene oxide, (+)-cis, trans-limonene oxide and (−)-cis, trans-limonene oxide, lactones, dilactones, lactams, lactides, thiolactones, thiolane, piperidine, pyrroline, pyrrolidine, aziridine, azirine, oxirene, thiirane, thiirene, phosphirane, phosphirene, azetidine, azete, thietane and thiete, and ε-caprolactones.

12. The method according to claim 9, wherein the nucleophile used in step d) is selected from the group consisting of amines, phosphines, arsanes, ethers, alcohols, thiols, sulfides, and selenium-containing molecules.

13. A curable composition comprising at least one bi-functionalized polysiloxane brush copolymer according to claim 1.

14. A curable adhesive or a sealant or a coating composition comprising at least one bi-functionalized polysiloxane brush copolymer according to claim 1.

15. The curable adhesive or a sealant or a coating composition according to claim 14 wherein the bi-functionalized polysiloxane brush copolymer imparts antimicrobial properties against at least one of mold, yeast, fungus, gram-positive bacteria or gram-negative bacteria.

\* \* \* \* \*